March 11, 1930.  H. M. ROCKWELL  1,750,127
PISTON FOR INTERNAL COMBUSTION ENGINES
Filed Oct. 12, 1926
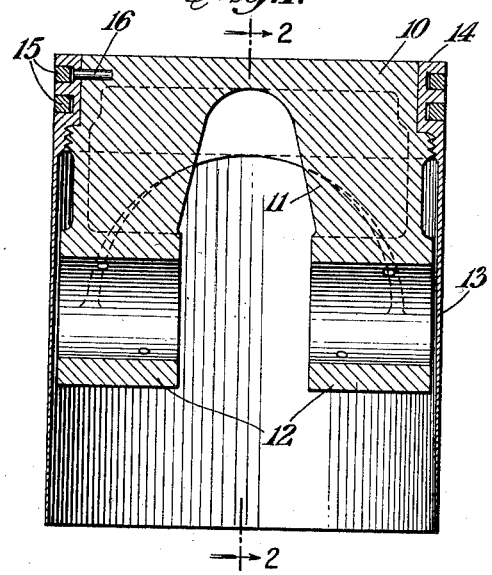
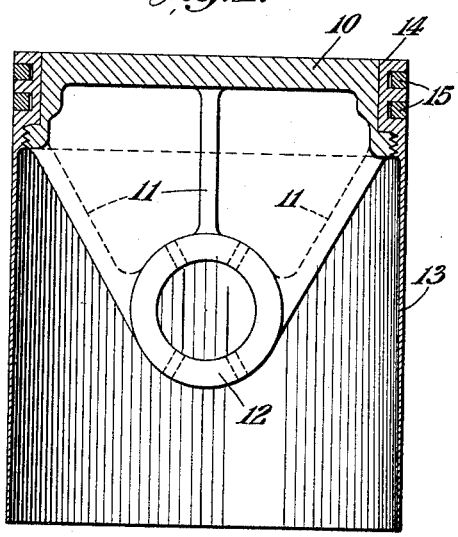
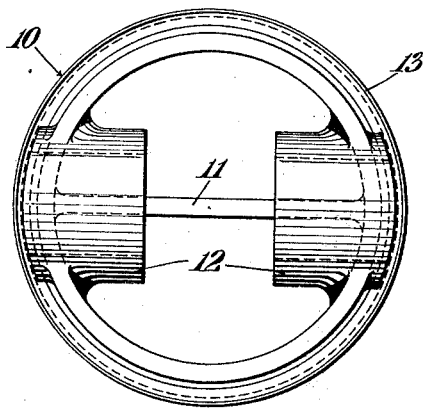
Inventor
Hugh M. Rockwell
By his Attorneys
Kenyon & Kenyon Patented Mar. 11, 1930

1,750,127

UNITED STATES PATENT OFFICE

HUGH M. ROCKWELL, OF NEW HAVEN, CONNECTICUT

PISTON FOR INTERNAL-COMBUSTION ENGINES

Application filed October 12, 1926. Serial No. 141,045.

This invention relates to pistons for internal combustion engines and has for an object an efficient, light weight piston, the skirt of which is sufficiently resilient closely to conform at all times to the wall of the cylinder in which it is mounted.

According to the invention, the piston comprises a head cast from some light metal; such, for example, as aluminum, to which is threaded or otherwise attached one end of a cylindrical skirt of steel or other wear-resisting metal. The skirt is of larger exterior diameter and of less thickness at its free end than at the end which is attached to the head. The exterior diameter of the skirt at the juncture thereof with the head is less than the interior diameter of the cylinder in which it is to be used, whereas its diameter at the other end is sufficiently large that it fits snugly or may even be slightly compressed when arranged within the cylinder. Because of the thinness of the sleeve at this end, it is resilient, and because of its resiliency the skirt at all times closely conforms to the wall of the cylinder. Also because of the resiliency of the skirt, there is no tendency of the piston to seize. Moreover, it acts very efficiently to scavenge the oil from the cylinder walls.

Other objects, novel features and advantages of the invention will be apparent from the following specification and accompanying drawings, wherein Figure 1 is a section taken on the line 1—1 of Fig. 2;

Fig. 2 is a section taken on the line 2—2 of Fig. 1; and

Fig. 3 is a section taken on the line 3—3 of Fig. 1.

10 is a head cast from some light metal such, for example, as aluminum. Integral with the head and supported therefrom by webs 11 are wrist pin bosses 12. One of the webs 11 extends axially of the bosses and is cut away in alignment with the space between the ends of the bosses. The other two webs extend obliquely from the bosses to the head. The upper end of the head 10 is cut back to form a shoulder 12 and that part of the head of larger diameter is exteriorly threaded. A cylindrical skirt 13 of wear-resisting metal, such as steel, has an internal annular projection 14 below which the skirt 13 is interiorly threaded. The skirt 13 is slipped over the head 12 and attached thereto by engaging the threads on the respective members and screwing them together tightly. In the part 14 of the skirt 13 are provided grooves in which are arranged piston rings 15. A locking pin 16 extends from the bottom of one of the grooves in the part 14 into the head 12 to prevent relative movement of the skirt and head. The holes in which this locking pin are arranged may be drilled in the head and skirt after they have been screwed together. This pin is held in locking position by the piston ring arranged in the groove. A tight joint is obtained between the head and the enlarged portion of the skirt 13 by reason of the difference in the coefficient of expansion of the two metals used.

The skirt 13 decreases in thickness from the end which is attached to the head toward the free end, and the exterior diameter of the skirt increases in the same direction. The relative diameters of the skirt at opposite ends are such that the free end fits snugly the cylinder into which it is inserted, whereas the other end is somewhat less in diameter than the cylinder. This permits expansion of the head 10 without causing the piston to seize. The free end of the piston is so thin that it is quite resilient, and this resiliency compensates for any variation in shape or size of the cylinder. The skirt 13 is of such length that it extends beyond the bosses 12 so that a wrist pin arranged therein is located by the skirt and is prevented from contacting with the cylinder wall.

Because of the intimate contact of the free end of the skirt with the cylinder wall, the piston is very effective in scavenging the cylinder wall. Moreover, because of the resiliency and lightness of the skirt, there is no noticeable piston slap. Also, the resiliency of the skirt prevents the latter from seizing. Because of the cylindrical shape of the skirt, it may be very accurately made, as it is possible to machine it both inside and out. Use of pistons of this character has shown that, even when running very hot, there is no tendency for them to score the cylinders. Instead, the cylinders have the effect of burnishing the piston skirt.

I claim:

1. A piston comprising a thin resilient cylindrical skirt having a collar at one end of less internal diameter than the remainder, said collar having a threaded recess, a head contained completely within said skirt, said head having a portion closing the end of said skirt and a threaded portion of larger diameter engaging said threaded recess, piston ring grooves in said collar, a pin extending through said collar and into said head to prevent relative rotation, said pin being held in place by a piston ring, and wrist pin bosses carried by said head, said skirt having a continuous lateral surface extending beyond said bosses.

2. A piston comprising a thin resilient cylindrical skirt having a collar at one end of less intermediate diameter than the remainder, said collar having a threaded recess, a head contained completely within said skirt, said head having a portion closing the end of said skirt and a threaded portion of larger diameter engaging said threaded recess, and wrist pin bosses carried by said head, said skirt having a continuous lateral surface extending beyond said bosses.

In testimony whereof, I have signed my name to this specification.

HUGH M. ROCKWELL.